May 26, 1959 J. A. STROTHER ET AL 2,887,951
MAIL CANCELING DEVICE
Filed Jan. 14, 1957 4 Sheets-Sheet 1
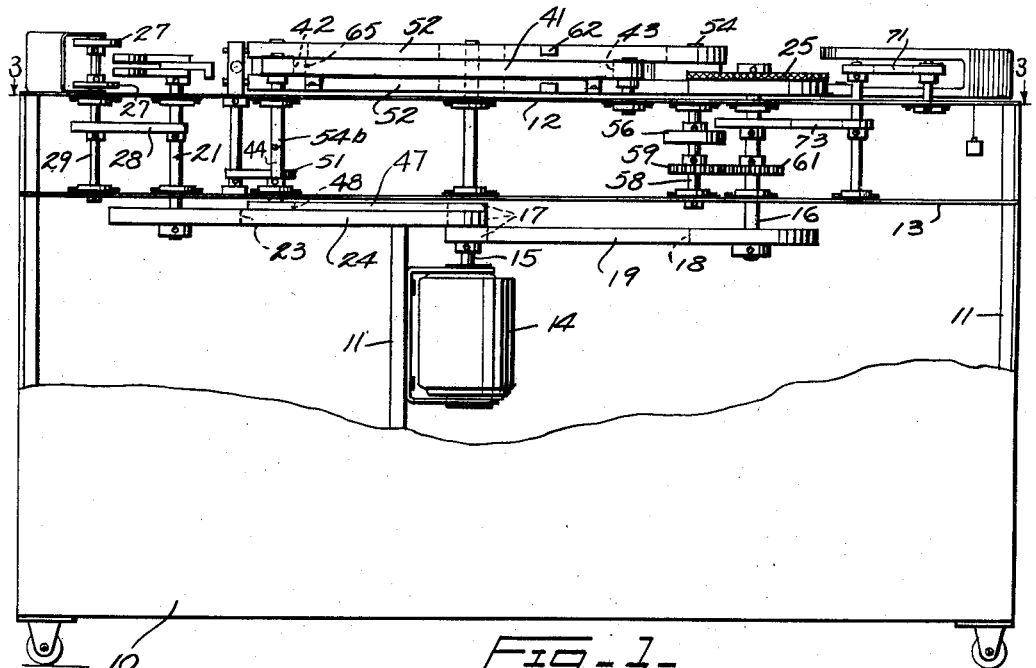
Fig-1-
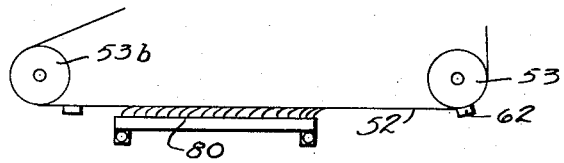
Fig-12-
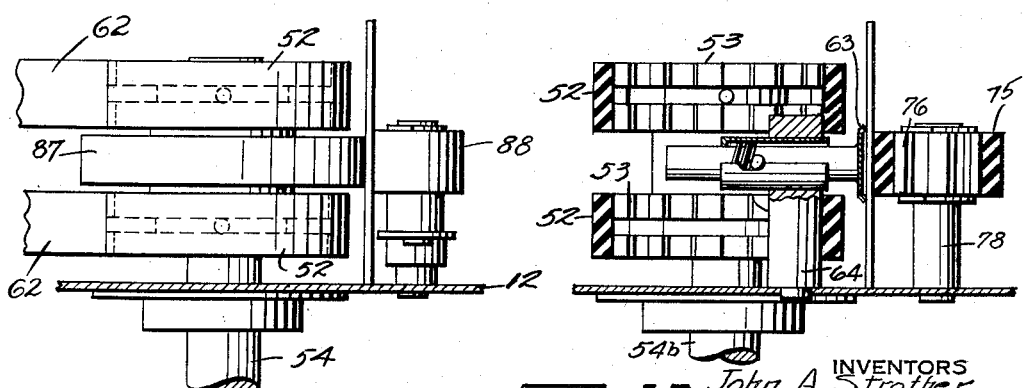
Fig-14- Fig-13-
INVENTORS
John A. Strother
Walter J. Hanson
Deane A. Beytes
BY Edwin H. Owen
ATTORNEY May 26, 1959 J. A. STROTHER ET AL 2,887,951
MAIL CANCELING DEVICE
Filed Jan. 14, 1957 4 Sheets-Sheet 2
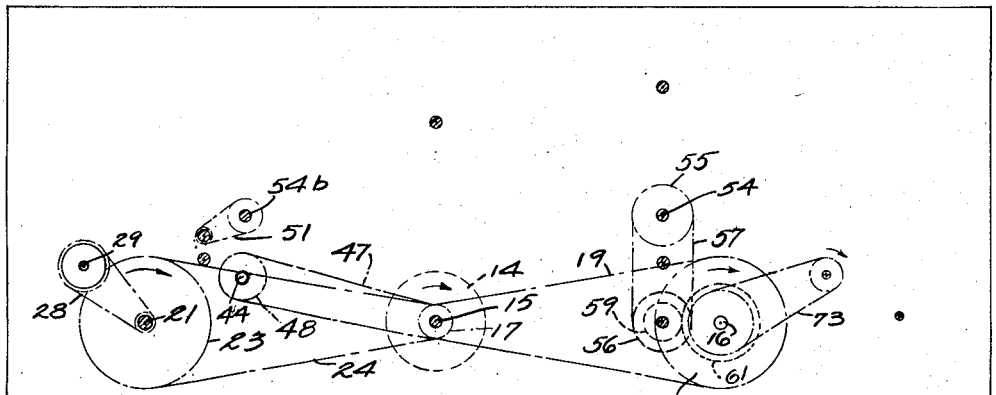
Fig-3-
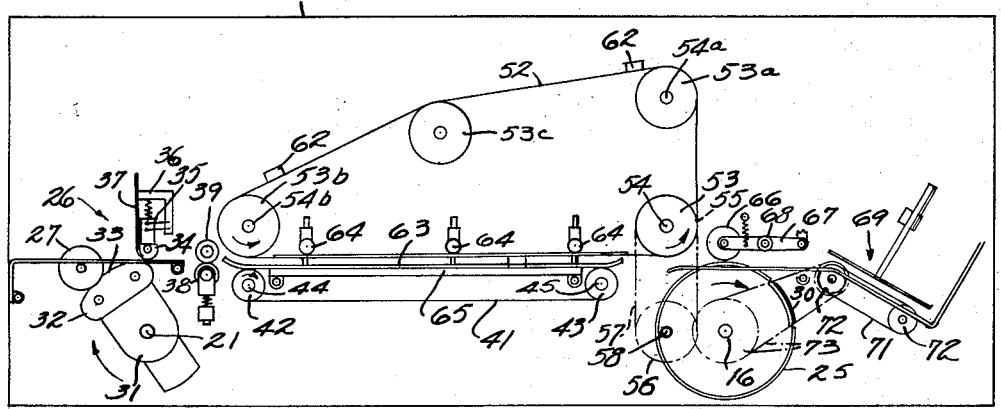
Fig-2-
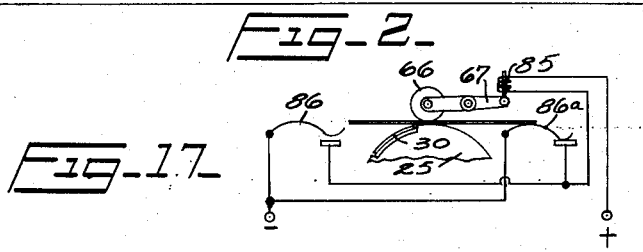
Fig-17-
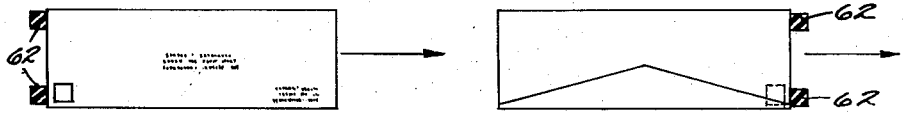
Fig-15- Fig-16-
INVENTORS,
John A. Strother
Walter J. Hanson
Deane A. Beytes
BY
ATTORNEY

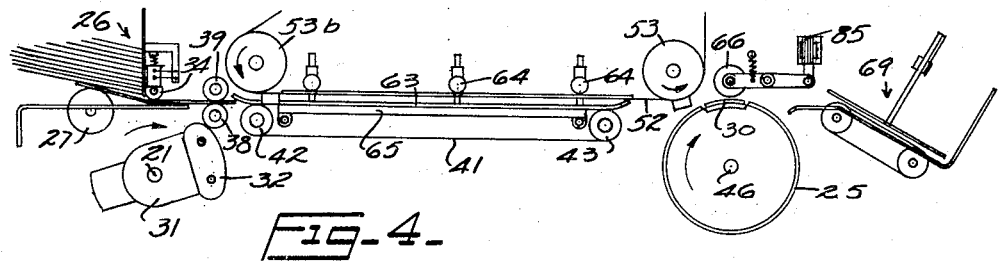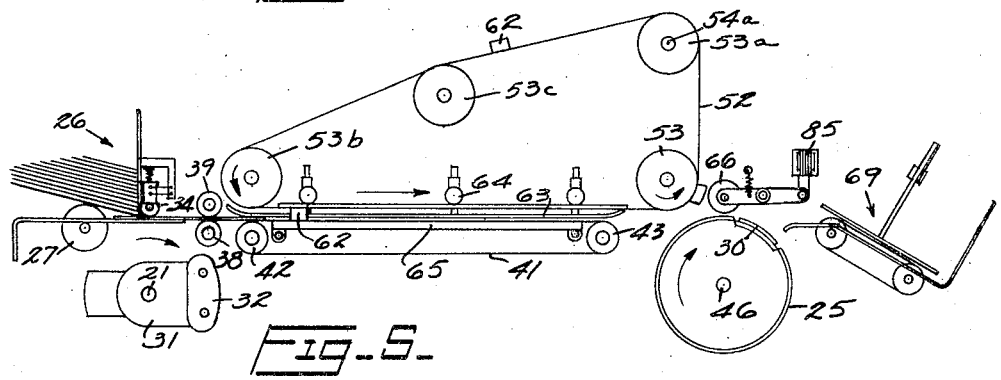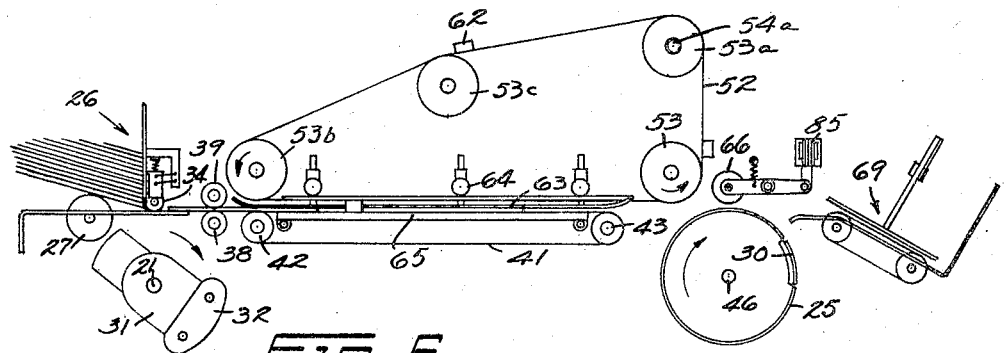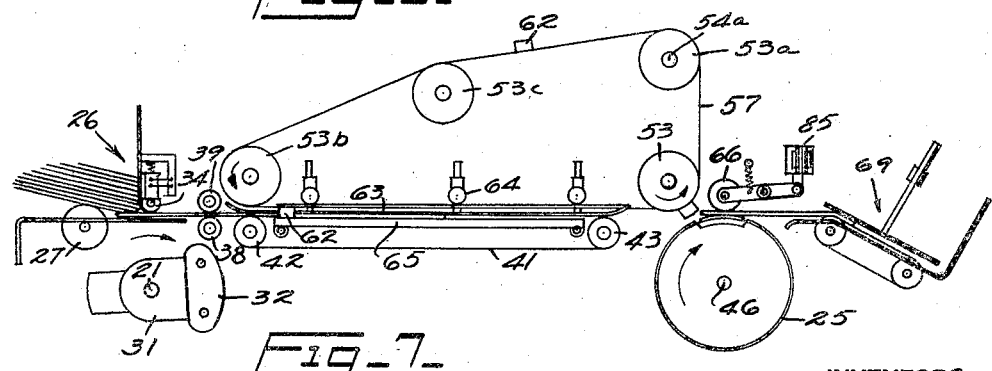

May 26, 1959  J. A. STROTHER ET AL  2,887,951
MAIL CANCELING DEVICE
Filed Jan. 14, 1957  4 Sheets-Sheet 4
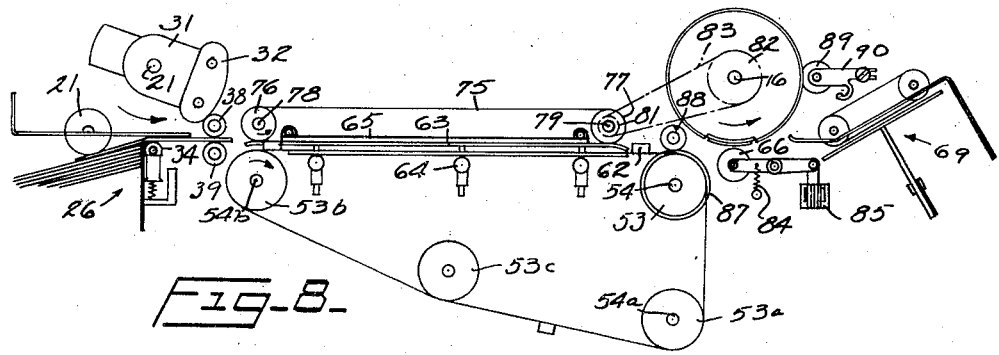
FIG-8-
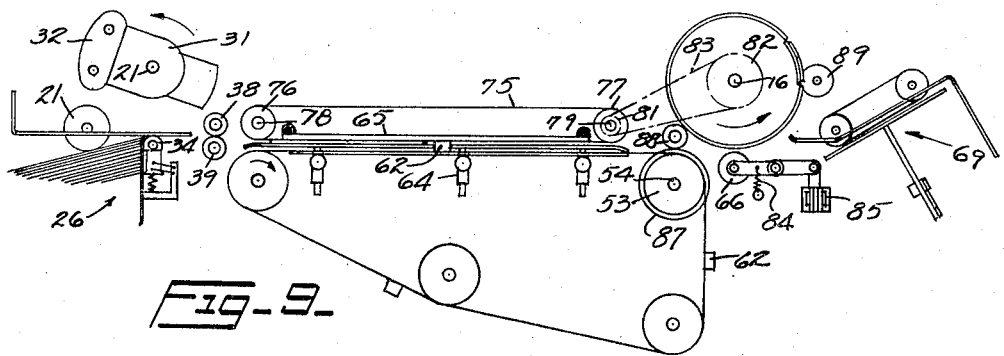
FIG-9-
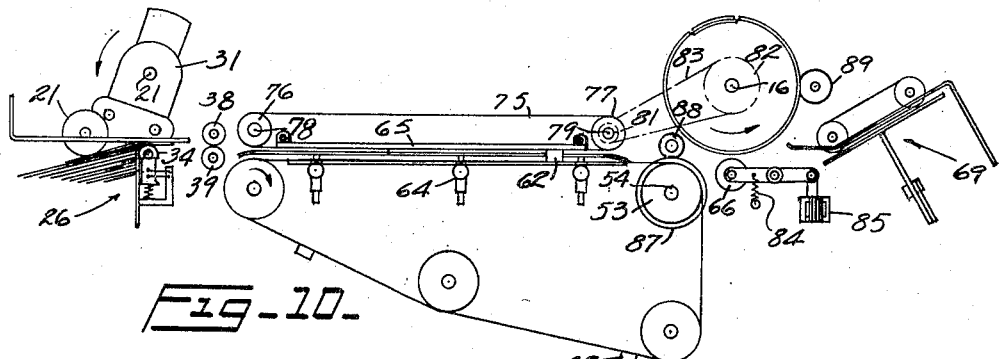
FIG-10-
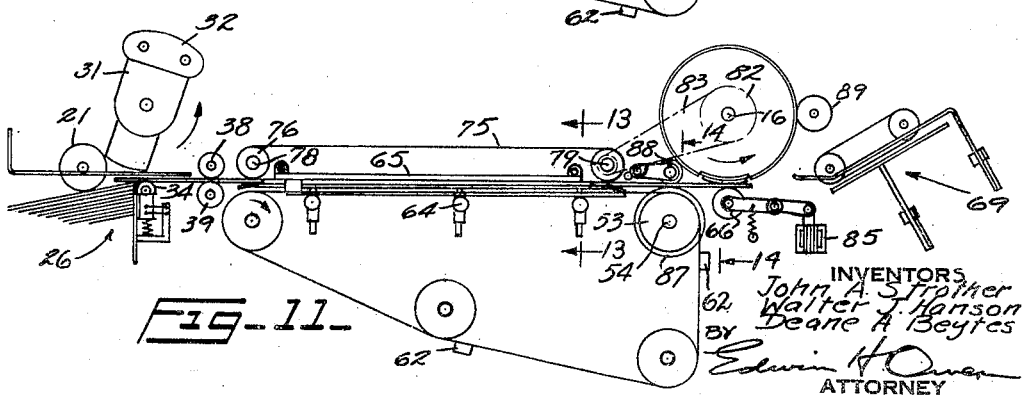
FIG-11-
INVENTORS
John A. Strother
Walter J. Hanson
Deane A. Beytes
BY Edwin H. Owen
ATTORNEY

United States Patent Office 2,887,951
Patented May 26, 1959

2,887,951

MAIL CANCELING DEVICE

John A. Strother, Stamford, Walter J. Hanson, Old Greenwich, and Deane A. Beytes, Norwalk, Conn., assignors to Pitney-Bowes, Inc., Stamford, Conn., a corporation of Delaware Application January 14, 1957, Serial No. 633,958

2 Claims. (Cl. 101—232)

This invention relates to a device for printing an impression within a predetermined area on a document and more particularly to the printing of a cancellation mark over a postage stamped area of a piece of mail, commonly referred to as a "letter," when the letter passes through a canceling machine with the stamp either in a leading or trailing position.

The normal manner of machine canceling stamps is to first face the letters with stamps downward and in a leading position on the envelope, place the faced letters in a canceling machine hopper and automatically feed one letter after another past a stamp canceling printing die. The canceling die starts and stops for each printing operation, the same being clutch controlled and tripped by each piece of mail passing through the machine.

In the machine of the present invention, the printing die rotates continuously and the letters are controlled during the feeding thereof so as to become synchronized or timed to the rotation of the printing die for the accurate printing of the canceling impression across the stamped area thereof.

It is the principal object therefore to provide means to control the feed of documents or letters to effect the accurate printing of an impression in a prescribed area with a continuously rotating printing die.

It is a further object to initially feed documents or letters in sequence to a conveying position but without regard for timing, then following through with a controlled conveyor element which overtakes the document and moves it in a timed relation to the printing die. This is particularly adapted for moving a letter which has its stamp at the trailing end thereof.

It is also an object to control documents or letters after reaching the initial conveying position by accelerating the conveyance of the letter until it reaches a controlled element moving at a slower speed but in timed relation to the printing die. This is particularly adapted for moving a letter which has its stamp at the leading end thereof.

A preferred arrangement of the invention is shown in the drawings, wherein:

Fig. 1 is a front elevational view with part broken away showing a document feeding and impression printing device;

Fig. 2 is a plan view of Fig. 1;

Fig. 3 is a plan sectional view taken along the lines 3—3 of Fig. 1;

Figs. 4 through 7 are operational views of the document or letter feeding and printing elements and particularly showing the feed associated with a retarding feed belt;

Figs. 8 through 11 are operational views similar to those in Figs. 4 through 7 and particularly showing the feed assisted by an accelerating feed belt;

Fig. 12 is a partial plan view of the document or letter feeding and printing elements of Fig. 4, with a brush substituted for the retarding feed belt;

Fig. 13 is a sectional view taken along the lines 13—13 of Fig. 11;

Fig. 14 is a sectional view taken along the line 14—14 of Fig. 11;

Fig. 15 is a face view of a letter with the postage stamp in the lower left hand corner and being conveyed in the direction of the arrow by means of lugs behind the trailing edge thereof in a timed relation to the printing device;

Fig. 16 is a view similar to Fig. 15 except that the letter is in a reverse order with the stamp in the lower right hand corner and with the leading edge of the letter engaging lugs which control the movement thereof in a timed relation to the printing device; and Fig. 17 is a fragmentary view of a solenoid operated impression roller with switch controls and wiring therefor.

Referring to the drawings in detail, the machine generally comprises a housing 10 consisting of a frame structure 11 which supports a deck plate 12 at the upper ends thereof and a lower deck plate 13.

A motor 14 is vertically supported on part of the frame structure and has a shaft 15 extending upwardly therefrom. A drive is provided to a shaft 16 by means of the drive pulley 17 on shaft 15, a driven pulley 18 and a belt 19. The shaft 16 extends vertically upward through the deck plates 13 and 12 and is suitably supported by bearings as indicated. Another shaft 21 extends vertically upward through the deck plates 13 and 12, at the left end of the machine, as viewed from Fig. 1, and is driven by means of the drive pulley 17, a driven pulley 23 and a belt 24. The shaft 21 is also suitably supported by bearings as indicated in Fig. 1. The belts 19 and 24 and other belts to be described are preferably toothed timing belts.

At the upper end of the shaft 16 and above the deck plate 12 is a printing drum 25, which drum is adapted to be continuously rotated by the aforesaid motor driven pulley and belt elements. A cancellation die 30 forms a part of the peripheral surface of the drum 25.

A feed mechanism is provided to advance documents or letters to a printing position relative to the printing drum 25 in an accurately timed relation to permit the prining of a cancellation mark in the case of the letters across a stamp in accordance with its pre-arranged position in either the lower trailing tnd of the letter or the leading end thereof.

The piece feeding mechanism includes a hopper 26 wherein documents or letters are adapted to be stacked on edge with the forwardmost piece resting against a continuously driven roller 27. The roller 27 is adapted to be driven by means of a pulley and belt drive indicated at 28 from the shaft 21 to a shaft 29, which latter shaft supports the roller 27. A so-called "bump feed" is provided which comprises an arm 31 mounted on the shaft 21 and has a pad 32 at the outer end thereof. Said pad 32 includes a curved peripheral and frictional surface 33 which wipes across the leading end of the foremost piece in the hopper and advances said piece in the direction of the printing drum 25.

A coacting separator unit is provided which prevents the feed of more than one piece and comprises a frictional element 34 suitably supported on a block 35. Said block 35 is yieldably mounted within a supporting bracket 36. A fence 37 also forms part of the separating unit and assists in holding the pieces in place in the hopper as well as preventing the feed of more than one piece during each feeding cycle of the bump feed pad 32.

Directly ahead of the separating unit are a pair of feed rollers 38 and 39. The roller 38 is driven from shaft 54b by a drive pulley and belt 51, Fig. 3, to thus provide for the further advancement of the foremost piece after passing through the feed and separator units.

An elongated feed belt 41 is carried by pulleys 42 and 43 and the pulleys are supported on vertical shafts 44 and 45 respectively. The shafts are suitably supported by the upper deck plate 12. The pulley 42 is driven from the shaft 15 through a pulley 17 and belt 47 to a larger pulley 48 on shaft 44 thereby effecting a retarded drive of the feed belt 41 for a purpose to be later described.

Another belt drive comprises a pair of belts 52—52 supported by three sets of pulleys indicated at 53, 53a and 53b which pulleys are supported on shafts 54, 54a and 54b respectively. An idler or belt take-up pulley is also provided at 53c. The shafts are suitably supported by the deck plate 12. The shaft 54 extends downwardly to the deck 13 and is driven by a pulley and belt drive comprising a pulley 55, a pulley 56 and belt 57. The pulley 56 is carried by a shaft 58 which shaft is suitably supported between the deck plates 12 and 13 and has a gear 59 thereon which meshes with a gear 61 on the printing drum shaft 16. The said gears 59 and 61 are of a predetermined ratio to provide a synchronized speed of the belts 52—52 with that of the printing drum 25. Lugs 62 are secured to and are equally spaced around the outer surfaces of the belts 52—52 at distances proportionate to the peripheral circumference of the drum. Also the inner reach of the belts 52—52 runs parallel to the inner reach of the belt 41 but in a spaced relation thereto.

A ski 63 is provided as best shown in Fig. 2 and is yieldably supported on three support brackets 64 carried by the upper deck plate 12. The ski engages with the inner reach of the belt 41 and provides a pressure element to force the pieces fed into frictional driving relation with the said inner reach of the belt 41. A backing element 65 is mounted on the upper deck plate 12 and bears against the reach of the belt 41 opposite the ski 63.

At the printing position an impression roller 66 is provided, the same being supported by a lever 67 carried by a support 68 which extends upwardly from the upper deck plate 12. Beyond the printing drum is a stacker station 69 and associated therewith is a driven belt 71 carried by pulleys 72—72, one of which is driven through a belt and pulley drive indicated at 73 from the printing die shaft 16.

Referring now to Figs. 4 through 7 which show the operation of the mechanism described above, the foremost document or letter is indicated in Fig. 4 as having advanced from the hopper through the rollers 38—39. In Fig. 5 the said letter is engaged between the inner reach of the belt 41 and ski 63 and is driven toward the printing drum 25 by means of the frictional engagement of the belt. Inasmuch as the belt 41 is moving slower than the belts 52—52, as effected by the drive 17, 47, 48, the lugs 62 on said belts 52—52 will overtake the trailing end of the letter, as in Fig. 6, and advance the letter relative to the belt 41. The lug portions thus control the advancement of the letter and effect the movement thereof at the same speed as the printing drum. The die portion 30 of the printing drum which is arranged to move the same distance as the distance between the lugs will engage the letter at the position of the stamp. In Fig. 7 the printing of the stamped end of the letter is shown, also the movement of said mail piece into the stacking unit 69.

In Figs. 8 through 11 a modified arrangement of the letter advancing belts is provided. In general the elements are the same as those previously described except that there is a belt 75 which runs at an accelerated speed and cooperates with the ski 63 to initially advance the letters at an accelerated speed with relation to the belts 52—52.

Said modified arrangement is particularly adapted for the cancelling of stamps which are in a leading position with respect to the leading edge of the letter as shown in Fig. 16. In view of the stamp appearing on the back of the letter the elements are in a reversed relation to elements shown in Fig. 2. Where the parts are the same as previously described they will retain the same reference numerals.

The belt 75 is supported by pulleys 76 and 77 which pulleys are supported by shafts 78—79 respectively. The said shafts are suitably supported within the upper deck plate 12 and the shaft 79 has a pulley 81 which is driven from a larger pulley 82 by means of a belt 83. The pulley 82 is secured to the printing drum shaft 16 and thus provides the accelerated drive for the belt 75.

As shown in Fig. 8 the foremost letter has been advanced by the bump feed through the rollers 38—39 and in Fig. 9 the letter has advanced to a position between the belt 75 and ski 63 and with the leading and approaching the lugs 62. In Fig. 10 the letter has advanced to a position where the leading end thereof is in engagement with the lug portions 62. From this point on the lug portions control the feed of the letter until the engaged lugs move away from their engaging position upon passing around the pulleys 53. The letter feed is continued, however, by means of a driven roller 87 on shaft 54 and idler roller 88. By means of the said rollers 87 and 88 the letter is moved to a printing position as in Fig. 11 at the same time the printing die is in a position to engage the stamped portion of the letter.

An alternate arrangement for retarding the movement of the movement is shown in Fig. 12 wherein a stationary frictional element 80 is provided to replace the retarding belt. This element may be in the form of a brush or any other desirable frictional surface.

In a printing device of this character it would be possible for a misfeed of a letter at the bump feed station, thereby preventing the passage of the letter to the printing drum and impression roller. To prevent the printing of an impression on the impression roller if the latter should occur, suitable means will be provided to hold the impression roller in a non-engaging position with relation to the drum. One method of accomplishing the latter would be to have the impression roller normally disengaged from the drum, as by means of a spring 84, and to provide a solenoid operated impression roller arm as indicated at 85. Operation of the solenoid would be provided by means of suitable switch elements as indicated at 86—86a arranged at either side of the printing drum. This would cause the leading end of the letter to engage the first switch 86 to close an electrical circuit to the solenoid and thereby cause the impresison roller arm to be rocked to a roller engaging position. The second switch 86a would also be engaged by the letter after it leaves the printing position to maintain the impression roller in an engaged position until the entire letter has passed the printing position.

Inking means may be provided in any convenient manner such as indicated in Fig. 8, where an ink roller 89 is shown mounted on a bracket 90.

What is claimed is:

1. In a device for printing cancellation marks over postage stamps on pieces of letter mail while the letters move on edge, vertically spaced letter conveying belts having letter engaging elements thereon, a continuously moving belt associated with the conveying belts and having a frictional surface contacting one surface of the letter, a yieldable ski between the conveying belts engageable with the surface of the continuously moving belt, means at one end of the conveying belts to direct letters between the yieldable ski and continuously moving belt, a rotary printing die at the other end of the conveying belts, continuous and synchronous drives to the conveying belts and printing die, and means to drive the continuously moving belt at a speed slower than the letter conveying belts, whereby each letter is retarded in its movement until the trailing end thereof is engaged by the engaging elements.

2. In a device for printing cancellation marks over postage stamps on pieces of letter mail while the letters move on edge, two vertically spaced letter conveying belts having letter engaging elements thereon, a continuously moving belt associated with the conveying belts and having a frictional surface contacting one surface of the document, means at one end of the conveying belts to direct letters to the conveying belts and continuously moving belt in sequence, a rotary printing die at the other end of the conveying belts, continuous synchronous drives to the conveying belts and printing die, belt supporting pulleys for said conveying belts, a vertical drive shaft having two of said pulleys spaced thereon adjacent the rotary printing die, means to drive the continuously moving belt at a speed faster than the letter conveying means, whereby the letter continues at the faster speed until the leading end thereof engages with engaging elements of the conveying belts, and a roller on said drive shaft between the pulleys thereon and cooperating with an idler roller to effect the final drive of the letter to the printing die after the letter engaging elements leave the leading end of the document.

References Cited in the file of this patent

UNITED STATES PATENTS

| | | |
|---|---|---|
| 632,447 | Dexter | Sept. 5, 1899 |
| 1,453,773 | Upham et al. | May 1, 1923 |
| 1,698,187 | Clatworthy | Jan. 8, 1929 |
| 2,101,268 | Novick | Dec. 7, 1937 |
| 2,432,133 | Babicz | Dec. 9, 1947 |